United States Patent

Beach

[15] 3,661,063
[45] May 9, 1972

[54] MECHANISM FOR SENSING THE CONDITION OF A PERCUSSIVE FLASH DEVICE AND FOR EFFECTING SYNCHRONOUS PERCUSSIVE FLASH EXPOSURES

[72] Inventor: David E. Beach, Penfield, N.Y.

[73] Assignee: Eastman Kodak Company, Rochester, N.Y.

[22] Filed: Mar. 27, 1970

[21] Appl. No.: 23,127

[52] U.S. Cl. ..................................................95/11.5
[51] Int. Cl. ...................................................G03b 9/70
[58] Field of Search ....................................95/11, 11.5

[56] References Cited

UNITED STATES PATENTS

| 590,204 | 9/1897 | Blackmore | 95/11.5 |
| 3,391,621 | 7/1968 | Nerwin | 95/11 |
| 3,528,353 | 9/1970 | Colville | 95/11 |
| 3,552,287 | 1/1971 | Fink | 95/11.5 |

Primary Examiner—John M. Horan
Assistant Examiner—T. A. Mauro
Attorney—Robert W. Hampton and D. Peter Hochberg

[57] ABSTRACT

A mechanism for effecting synchronous flash exposures in a camera adapted to receive a percussive flash device of the type incorporating a pre-energized impacting member. According to several embodiments, a high energy lever is released from a set condition in response to the displacement of a release member, and operates to actuate the camera shutter and release the impacting member of the flash device, thereby effecting a synchronous flash exposure. The condition of the impacting member at the camera firing site is determined by a gear driven actuating probe, which additionally serves to fire the flash device. A visual signal indicates that the impacting member is not in the set condition. According to other embodiments, displacement of a release member by a prescribed amount in turn moves a latch which releases high energy levers for effecting synchronous flash exposures.

2 Claims, 11 Drawing Figures

PATENTED MAY 9 1972 3,661,063

DAVID E. BEACH
INVENTOR.

D. Peter Hochberg
BY
Robert W Hampton
ATTORNEYS

DAVID E. BEACH
INVENTOR.

BY D. Peter Hochberg

Robert W. Hampton

ATTORNEYS

DAVID E. BEACH
INVENTOR.

MECHANISM FOR SENSING THE CONDITION OF A PERCUSSIVE FLASH DEVICE AND FOR EFFECTING SYNCHRONOUS PERCUSSIVE FLASH EXPOSURES

CROSS-REFERENCES TO RELATED APPLICATIONS

Reference is made to copending commonly assigned U.S. Application Ser. No. 767,145, entitled "Control and Signal Mechanism for Use with Percussion-Ignitable Photoflash Lamps," filed Oct. 14, 1968 in the name of Edward L. Sturm; U.S. Application Ser. No. 850,007, entitled "Flashlamp Sensing and Percussive Firing Mechanism for Photographic Apparatus," filed Aug. 14, 1969, in the name of William T. Hochreiter; and U.S. Application Ser. No. 23,129, entitled "Mechanism for Effecting Synchronous Percussive Flash Exposures," filed on even date herewith in the name of William T. Hochreiter, Now Defensive Publication No. T892,022.

BACKGROUND OF THE INVENTION

1. Field of the Invention

The present invention relates to cameras adapted to receive percussion ignitable flash devices of the type incorporating a pre-energized impacting member for igniting the flash. More specifically, the present invention relates to mechanisms in such cameras for actuating the camera shutter and for releasing a pre-energized impacting member from a set condition to ignite a flash in timed relation with shutter actuation. The invention additionally relates to mechanisms for sensing and indicating the condition, either set or released, of a percussive flash impacting member at the flash firing site of the camera.

2. Description of the Prior Art

It is well known in the photographic art to provide cameras and photographic attachments with a built-in artificial light source or flashlamp, and to electrically fire the lamps in synchronism with operation of a camera shutter to properly expose file in the camera under low scene light conditions. It is also known in such electrical firing devices to provide electrical means, as disclosed for example in commonly assigned U.S. Pat. No. 3,383,995, entitled "Bulb Sensing Means," and issued on May 21, 1968 in the name of Richard J. Bresson, for sensing the active or inactive condition of a flashlamp preparatory to the firing thereof. More recently, percussively ignitable flashlamps or flashlamp devices have been developed that include a percussion sensitive primer material ignitable by an impacting or mechanical force to fire the lamp. In the preferred embodiment of such devices, a plurality of flashlamps are contained in a multilamp unit or flashcube provided with a striker member or wire for each flashlamp. The striker is maintained in a pre-energized or set position, spaced from its respective flash-lamp, and is dislodgable or releasable to rapidly impact and fire such lamp.

As illustrated and described in commonly assigned copending U.S. Applications Ser. No. 767,145, entitled "Control and Signal Mechanism for Use with Percussion-Ignitable Photoflash Lamps," filed Oct. 14, 1968 in the name of Edward L. Sturm; and Ser. No. 850,701, entitled "Flash Firing and Sensing Mechanism for Camera or Attachment Adapted to Use Percussively Fireable Flashlamps," filed Aug. 14, 1969 in the names of William H. Horton and Chester W. Michatek, camera mechanisms have been provided also for sensing the condition of, and firing, these percussively ignitable flashlamps.

Previous devices for sensing and firing electrical or percussive flashlamps have been generally satisfactory for their intended purpose. However, at least in certain circumstances, each suffers from disadvantages. In regard to electrical systems, most of these disadvantages are well known, and a few are set forth in the previously mentioned Horton and Michatek application Ser. No. 850,701. In regard to mechanical systems, completely new and previously unknown problems have been generated. For example, and as described more fully in the aforementioned Horton and Michatek application Ser. No. 850,701, it is likely that a mechanical sensing member will interfere with rotation of the multilamp unit. While various mechanisms have been designed to overcome this problem, they generally are cocked or reset in response to film winding and therefore increase the force necessary to operate the film-winding assembly. Moreover, the increased film-winding force may be substantial, especially in those mechanisms which retract the actuating member from the cube by camming means on the cube socket or the cube itself. This is necessarily true because the limited amount of cube rotation requires relatively fast-acting camming surfaces having little if any mechanical advantage. The same is true of the mechanism disclosed in the aforementioned Sturm application Ser. No. 767,145, even though the retraction of the actuating member is effected by the body release, since an additional impacting member is provided to fire the flashlamp, and this impacting member is precocked or set by the film-winding mechanism.

Moreover, in previously developed mechanisms which incorporate a probe to perform the striker sensing and dislodging operation, the probe element is driven by a spring or link member which is in abutting engagement only with the probe. Since the sensing and dislodging operation requires precise movement of the operative parts owing to the size and sensitivity of the striker, and to the limited path of movement of the probe, the previously developed mechanisms are susceptible to malfunctioning because of the imprecise means for engaging and driving the probe element.

SUMMARY OF THE INVENTION

An object of the present invention is the sense the condition of the striker of a percussive flash device received on a camera, and to release the striker from a pre-energized condition in synchronization with actuation of the camera shutter.

Another object of the invention is to operate a striker sensing and releasing member in a precise manner.

A more specific object of the present invention is to provide a camera mechanism operable in response to actuation of the body release for accurately sensing and indicating the condition of the striker of a received percussive flash device, and for releasing a pre-energized striker in synchronization with actuation of the camera shutter.

An additional object is to provide a mechanism of the aforementioned type which requires a small force for setting the components of the mechanism for operation, and which does not rely extensively on individual elements to provide the energy for the operation thereof.

Other objects will become apparent from the description to follow and from the appended claims.

In accordance with a preferred embodiment of the invention, a camera adapted to receive a percussive flash device of the type incorporating an impacting member or striker releasable from a set or pre-energized condition for igniting a flashlamp, is provided with a mechanism actuatable in response to displacement of the body release for sensing the condition of a striker at a firing site, and for releasing the striker in synchronization with actuation of the shutter. The presence or absence of the striker at the firing site is sensed by a gear driven probe which additionally serves as the means for dislodging the striker from its set position. The probe is moved either to a first position in engagement with a set striker, or to a second position indicative of the absence of a striker in firing position, a signal being rendered in response to the latter occurrence. After the probe assumes the first position, no warning signal having been rendered, further displacement of the body release unlatches a high energy lever which operates linkages for actuating the shutter and releasing the striker.

In accordance with another embodiment of the invention, displacement of a body release unlatches a pair of high energy levers which synchronously effect the release of a pre-energized percussive flash striker and the actuation of the camera shutter.

BRIEF DESCRIPTION OF THE DRAWINGS

In the detailed description of the invention presented below, reference is made to the accompanying drawings in which like numerals denote like parts and wherein.

DETAILED DESCRIPTION OF PREFERRED EMBODIMENTS OF THE INVENTION

Figure 1:
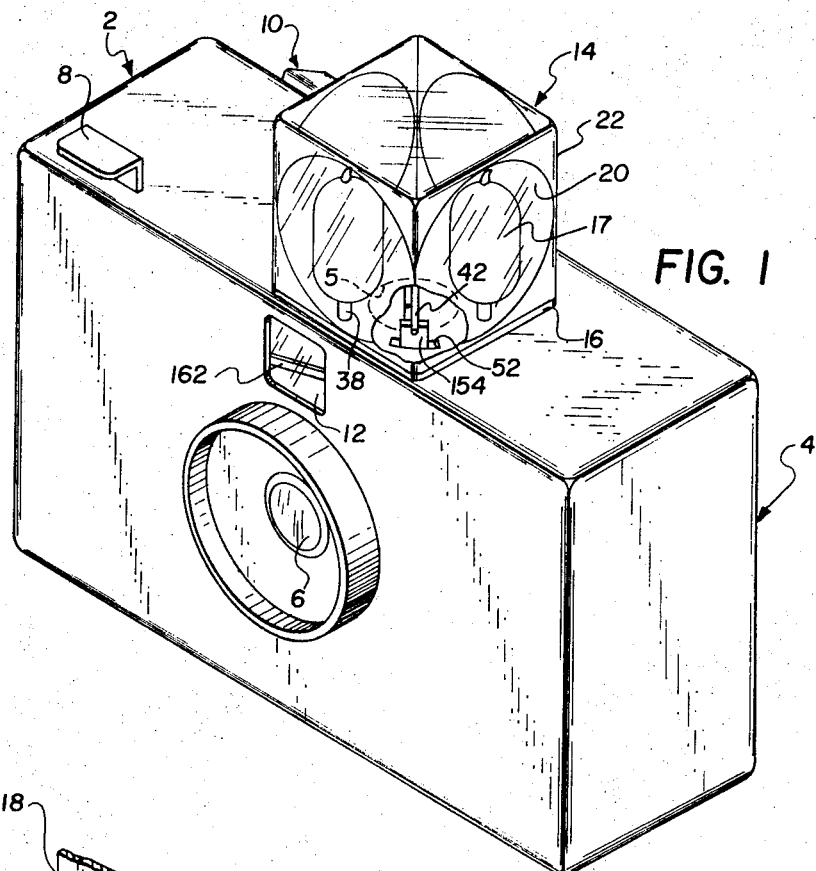
FIG. 1 is a perspective view of a camera according to the invention with a percussive flash device mounted thereon, portions being cut away to reveal relevant internal components thereof.

Referring to FIG. 1, a camera 2 comprises a housing 4 supporting an objective 6, a body release 8 for actuating the camera shutter, a film advancing arm 10, and a viewfinder 12. As will be described more fully hereinafter, camera 2 is particularly adapted to receive in a socket 5 a percussively ignitable flashcube 14 which is fireable synchronously with the operation of the camera shutter by mechanisms to be discussed in the following description.

Figure 2:
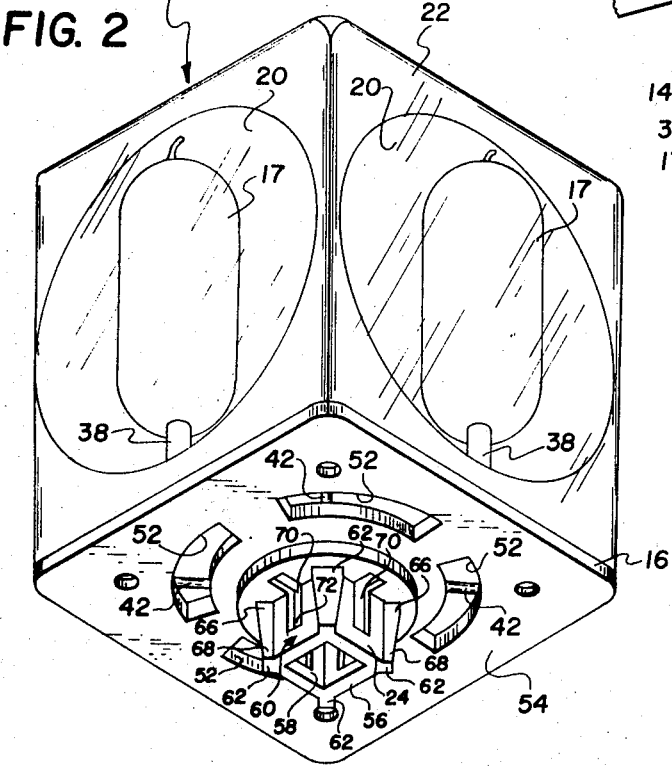
FIG. 2 is a perspective view of a percussive flash device which a camera according to the invention is adapted to receive and actuate.
Figure 3:
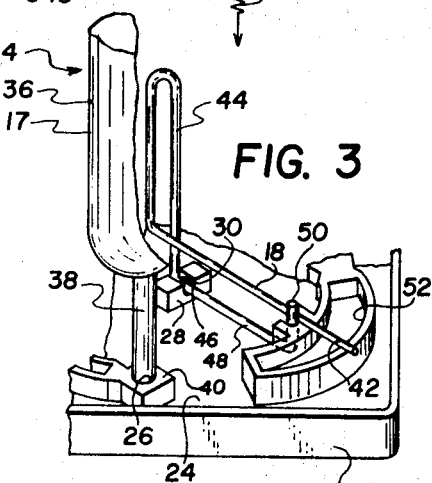
FIG. 3 is a partial perspective view of the device shown in FIG. 2.

The preferred flash device is illustrated in FIGS. 2 and 3. Flashcube 14 comprises a base 16 for supporting percussively ignitable flashlamps 17, an impacting member or striker wire 18 associated with each flashlamp, a reflector such as polished metal foil formed behind each flashlamp into concave discs 20, a cover member of light transparent material 22, and supporting or indexing means such as a post 24. In many respects, structural features of cube 14, such as the reflecting means and cover member, are somewhat similar to known electrically ignitable flashcubes, and will not be described in detail here. However, although the cube per se is not a part of the present invention, a description of certain cube features is provided below for a better understanding of the present invention.

Each of flashlamps 17 and corresponding striker wires 18 is securely supported on the upper face 24 of base 16 by means illustrated most clearly in FIG. 3. These supporting means define a circular hole or bore 26 for receiving and supporting a portion of the flashlamp, and a lug 28 having a cut out portion or groove 30 for receiving and supporting a portion such as knee 46 of striker wire 18. Upper face 24 of base 16 also may be provided with a stop peg or lodging means for maintaining or lodging the striker wire in its pre-energized condition. However, in the embodiment illustrated, the wire lodging function is performed by a bent portion of the striker wire itself, as will be described more fully hereinafter.

Each of the four flashlamps 17 comprises a hermetically sealed envelope 36 containing combustible material, such as a zirconium foil, in a combustion supporting atmosphere such as oxygen. The base or lower portion of envelope 36 is formed or sealed around an elongated tube 38 of readily deformable material, having a substantially circular cross section and surrounding or containing in spaced relation therein an anvil or back-up member (not shown). Ignition of the combustible material in the envelope is accomplished by rapidly deforming the tube with a percussive or impacting force to effect ignition of a percussively ignitable primer material, such as a fulminate coated on the anvil or located in the space between tube 38 and the anvil. Upon such igntion, the resulting heat energy deflagrates and is directed upwardly through tube 38 and into envelope 36 to initiate combustion of the zirconium foil or other combustible material in the envelope to fire the flashlamp. The base 40 of tube 38 also serves to support the envelope on the cube base and, for this purpose, is configured to cooperate with the circular hole or bore 26 in base 16 for securely supporting the flashlamp on the base.

The preferred lamp impacting member or striker wire 18 also is shown most clearly in FIG. 3, and comprises an elongate or striking leg 42, an upwardly bent central portion 44 adapted to be torsionally bent or tensioned to energize the striking leg, a knee 46 defined by the central portion for engaging the cube base to locate the striking wire on the base, and a second elongated or supporting leg 48 including a bent end portion defining a stop pin or lodging element 50 for maintaining or lodging the striking leg in the tensioned position. During manufacture of the cube, the striker wire is positioned in a pre-energized or pretensioned position in which it is maintained by lodging element 50 until the cube is fired.

To permit actuation or dislodging of this striker for percussively firing the lamp, an opening or cut-out portion 52 is provided in the base below energized striking leg 42. This opening is configured to receive a camera actuating and/or sensing member adapted to engage the wire to first sense the set or released position or condition of the wire and thereafter, if the wire is in a set condition, to rapidly push the striking leg upwardly over lodging element 50 to dislodge the striking leg. Upon such dislodging, the striking leg is rapidly moved into engagement with tube 38 by the torsional force stored in the central portion of the striker wire to deform the tube and fire the lamp as described hereinabove.

Supporting or indexing means 24 extends from the lower face 54 of base 16 and may be separately attached or integrally molded therewith. Supporting means 24 comprises a channel member 56 defining a square interior opening 58 and a substantially square external surface 60. At each of the four corners of the external surface, locating means are provided comprising splines 62, each having a tapered lowered portion 64 and a substantially square upper portion 66. Splines 62 are guided into camera socket 5 in part by the tapered portions, until they are fully seated therein, and then are held or maintained securely in their proper positions relative to the socket mainly by upper square portions 66. Also provided on the flat sides of external surface 60 and between splines 62 are recesses or slot portions 70, each having a slightly tapered lower surface 72 for cooperating with the socket latching means. For a more complete description of the camera socket for receiving flash device 14, reference is made to previously cited U.S. Ser. No. 850,701.

In summary, the flashcube described above supports a plurality of flashlamps and pre-energized strikers, one associated with each flashlamp. In order to fire one of the lamps, an actuating member is inserted through an opening in the base and into the cube to engage and dislodge the pre-energized striker from its pre-energized position. The striker then rapidly strikes the base of the flashlamp to ignite percussively the primer which, in turn, deflagrates into the envelope to ignite the combustible material and fire the lamp. In the energized position, the striker wire is located over the opening in the cube base. In the release position, the striker wire remains in contact with the lamp base and is spaced from the opening in the base of the cube.

Figure 4:
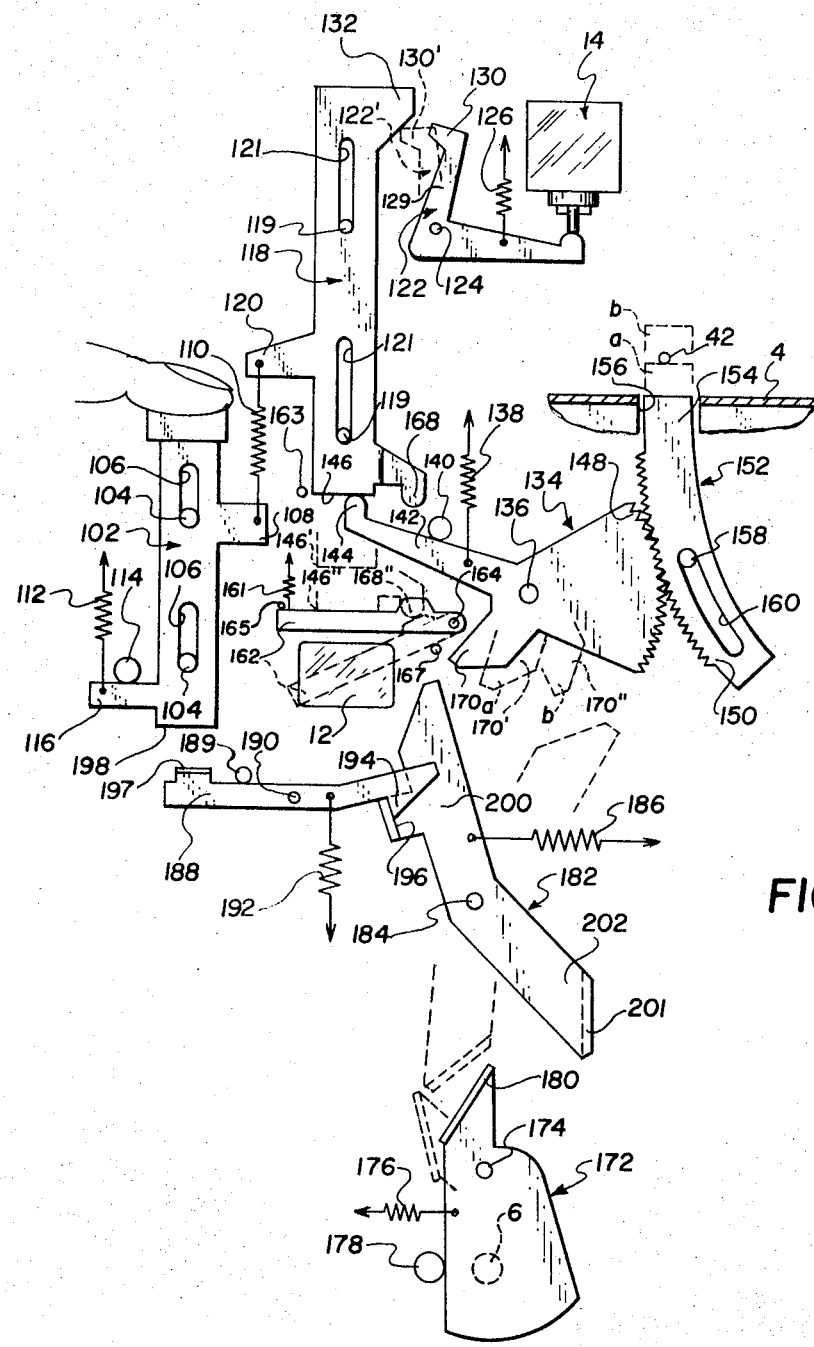
Figure 6:
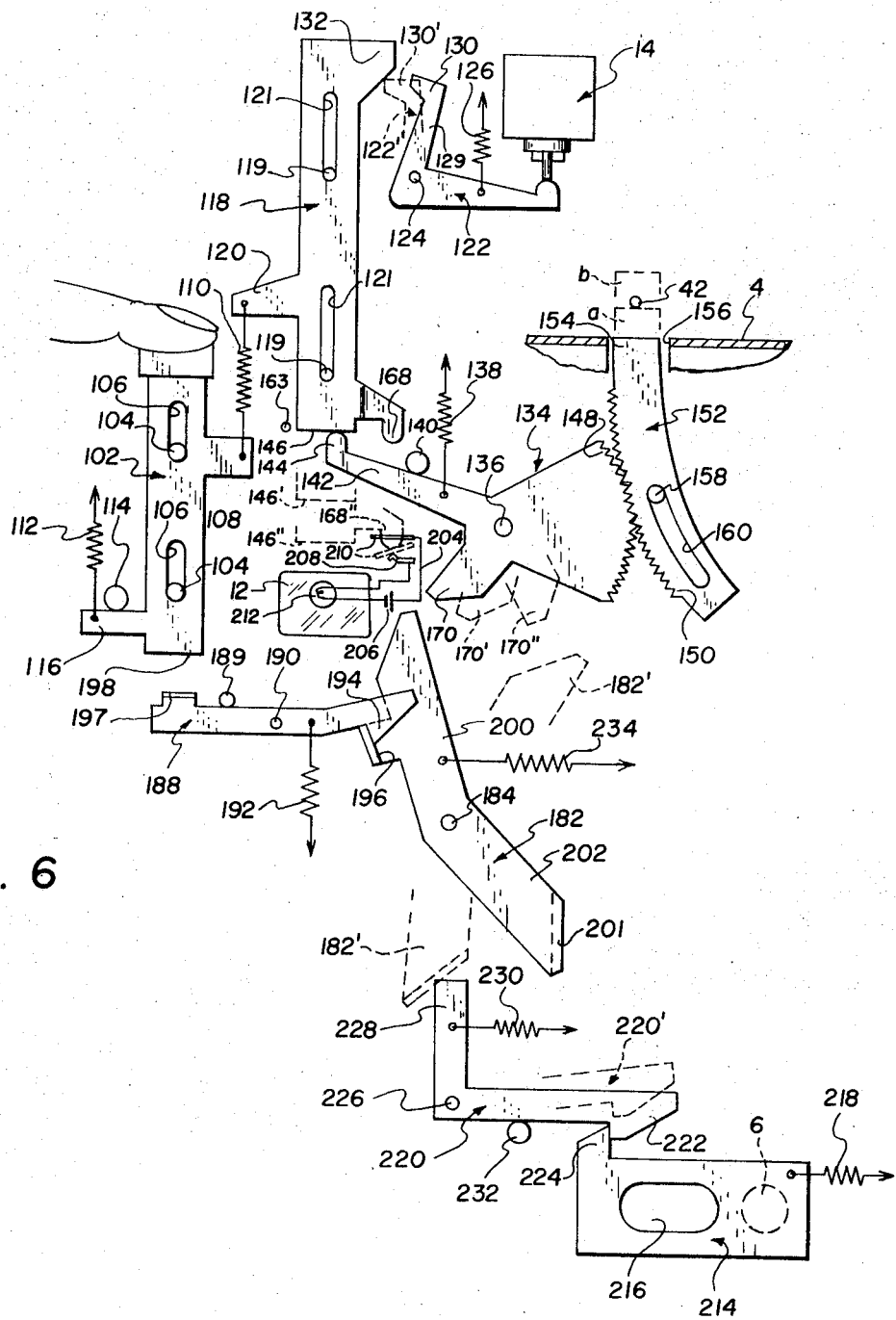
Figure 7:
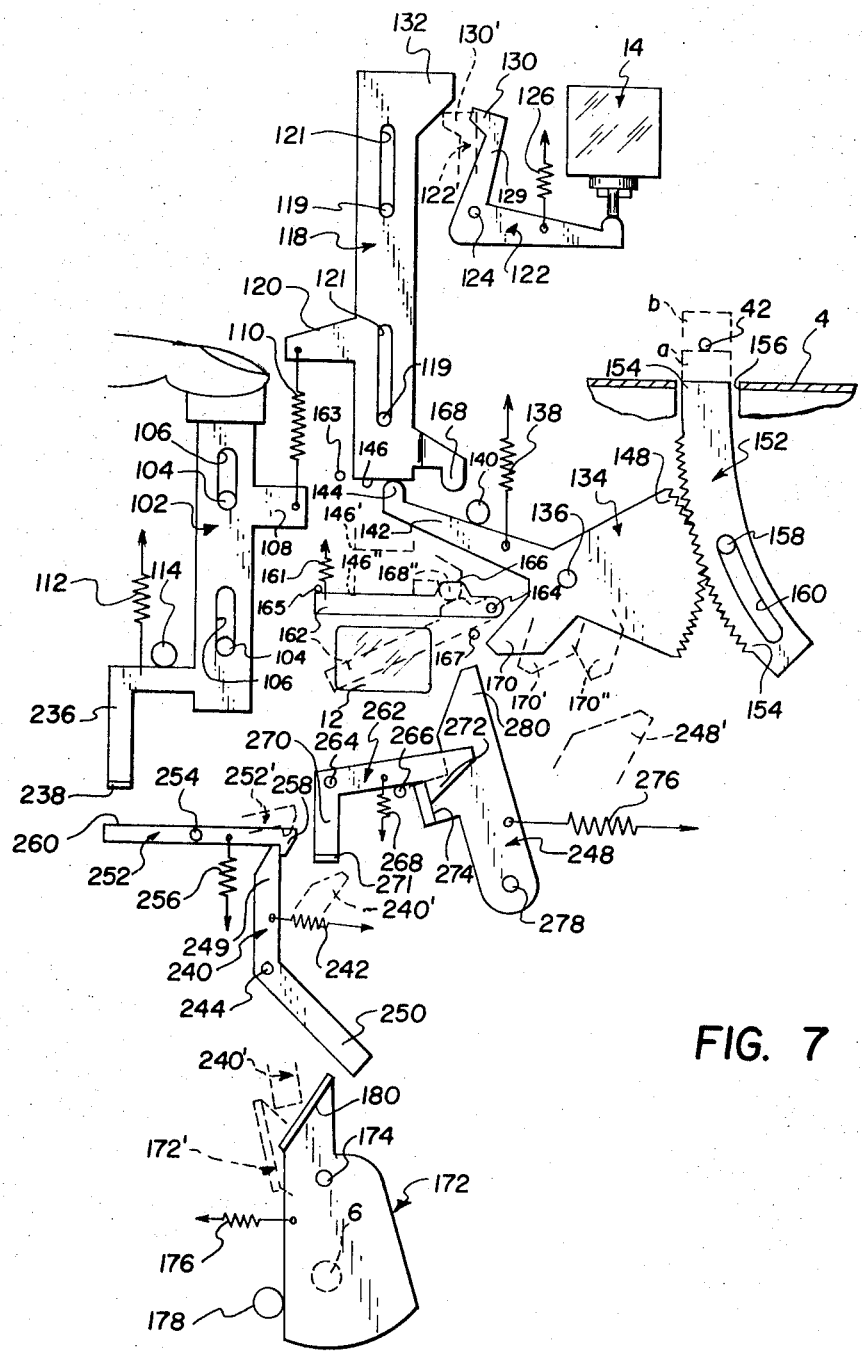

Reference will be made in sequence to the remaining figures, which depict various mechanisms for effecting synchronous flash exposures. The mechanisms in FIGS. 4, 6 and 7 are adapted to perform a variety of functions in various situations. In each of those mechanisms, the insertion of a flashcube in the camera socket releases the means for sensing the condition of striker wires of the received flash device and for effecting the ignition of lamps in the device, which means are otherwise blocked from operation. The absence of a pre-energized or set striker at the camera firing site is indicated by a visual warning signal. Finally, the mechanisms are provided with means for dislodging a pre-energized striker wire to ignite a flashlamp.

Referring to FIG. 4, a body release 102 initiates operation of the mechanism in response to the manual depression thereof. Release 102 is guided in its downward path by means of pins 104 extending through aligned slots 106. A leg 108 extends from release 102, and a spring 110 is attached thereto. Release 102 is urged upwardly to its initial position by a spring 112 which is attached to the camera frame (not shown), and the upward movement of release 102 is limited by a post 114 which is engageable by spring leg 116. A slide 118, which effects the flash sensing and firing functions, is coupled to release 102 by spring 110, which is attached at its upper end to leg 120 extending from slide 118. Slide 118 is guided in a linear path of movement by pins 119 extending through aligned slots 121. The downward path of slide 118 is limited by stop 163 in the path of leg 120.

An arm 122 is pivotally mounted on a post 124, and is urged in a clockwise direction by spring 126 connected to the camera frame. The insertion of a flashcube 14 in the camera rotates arm 122 against the force of spring 126 as shown by the solid lines. However, when no flashcube is inserted, arm 122 assumes the position shown by the dotted lines at 122', and an ear 130 on leg 129 blockingly engages an ear 132 extending from slide 118. In the later situation, slide 118 is prevented from effecting the aforementioned sensing and firing functions, and the depression of release 102 only actuates the shutter as described below, spring 110 merely stretching as release 102 is depressed.

A coupling 134 is pivotally mounted on a post 136 and biased in a clockwise direction by a spring 138 attached to the camera frame. The clockwise rotation of coupling 134 is limited by a lug 140 extending from the camera frame. An arm 142 is defined by coupling 134, and includes an ear 144 in abutting engagement with the base 146 of slide 118. On the opposite side of post 136 a sector gear 148 is provided for driving a second sector gear 150 on probe 152. It can be seen that the blocking of sector gear 150 also limits the movement of sector gear 148 and coupling 134.

Probe 152 has an upper portion 154 which lies flush with, or below, the outer surface of camera housing 4, and which can be extended through an opening 156 in housing 4. Probe 152 is guided in a curved path by a pin 158 extending through a curved slot 160 and by the surfaces defining opening 156. Probe 152 is displaced upwardly until portion 154 abuts against the striking leg 42 of a striking wire of flashcube 14, or until pin 158 engages the lower end of slot 160. The aforementioned positions are indicated by the letters a and b respectively in the drawings. Only one pre-energized striking leg 42 is operatively engageable by the mechanism, and the location at which the various functions relating to that striking leg take place is referred to here as the firing site.

Figure 5:
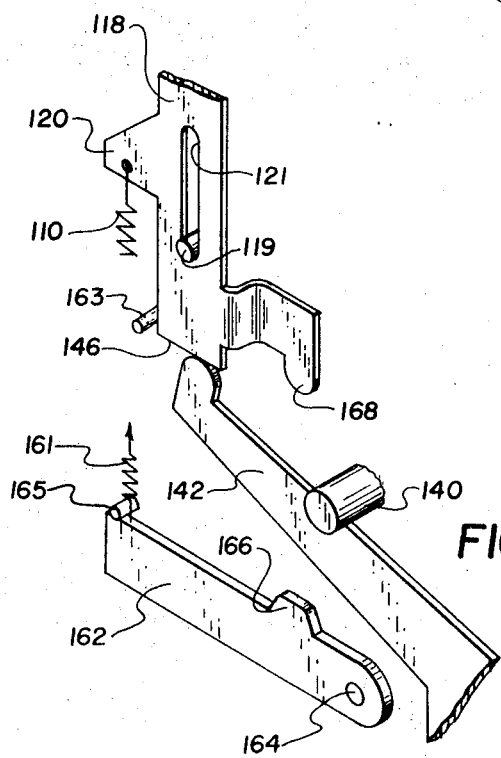
FIG. 5 is a partial perspective view of part of the mechanisms depicted in FIGS. 4 and 7.

A flag or signal 162, as shown in detail in FIG. 5, is mounted for pivotal movement about a post 164 extending from the camera frame, and is biased in a clockwise direction by a spring 161, such rotation being limited by a stop 165. Flag 162 is provided with an abutment 166 which is engageable by a similar abutment 168 and displaceable thereby to a position across viewfinder 12 against a stop 167, as indicated by the dotted lines at 162'(FIG. 4).

The sensing function of the mechanism can now be explained. Assuming flashcube 14 has been inserted in the camera socket, and ear 130 is not in the path of ear 132 on slide 118, the depression of release 102 effects a similar displacement of slide 118 via spring 110. As slide 118 moves downwardly, base 146 engages ear 144 of coupling 134 and rotates the latter in a counterclockwise direction, whereby sector gear 148 accurately and precisely moves probe 152 upwardly under the guidance of pins 158 and opening 156. Since there is not striker leg 42 in its path, portion 154 or probe 152 is moved to position b. As portion 154 approaches position b, the slide base assumes position 146'' and abutment 168 engages flag abutment 166 to move flag 162 across the viewfinder as shown at 162'. The latter occurrence warns the photographer that he cannot make a flash exposure with the flashcube in its present orientation in the camera, and he has sufficient time to release member 102 and refrain from making the exposure.

Coupling 134 is further provided with an arm 170. As indicated at 170' and 170'', respectively, arm 170 assumes one of the positions shown in dotted lines in response to the assuming by probe portion 154 of positions a and b respectively. Arm 170, when at position 170', is in the path of a lever 182 as explained below, whereas at positions 170 and 170'', it is out of that path. Spring 110 is weaker than the force required to dislodge a pre-energized striker leg 42, so that when slide 118 is moved downwardly, and coupling 134 rotates counterclockwise as explained above, the abutting the portion 154 against striker leg 42 precludes further depression of slide 118, and the base of the latter member assumes position 146'. Therefore, flag 162 cannot be displaced to a position visible in viewfinder 12, and arm 170 is positioned at 170' in the path of lever 182.

The camera is further provided with an impact shutter 172 which is mounted for pivotal movement about a post 174 and biased by a spring 176 in a clockwise direction against a stop 178. Shutter 172 is provided with an impact surface 180, which when struck with sufficient force, causes shutter 172 to rotate counterclockwise to permit light to pass through objective 6 to expose film loaded in the camera.

A high energy lever 182 is pivotally mounted on post 184, and is urged by a strong spring 186 in a clockwise direction. Lever 182 provides the energy for opening shutter 172 and for raising probe 152 to dislodge a pre-energized striker wire in flashcube 14. A latch 188, pivotally mounted on a post 190 and biased by a spring 192 towards a stop 189 in a clockwise direction, is provided with a tab 194 for releasably engaging a tab 196 extending from lever 182 to hold the latter in a set or tensioned position. An abutment surface 196 is defined on latch 188 in alignment with the base 198 of release 102, and adapted to be engaged by base 198 for releasing lever 182.

The mechanism provides for the synchronous firing of a flashlamp and the actuation of the camera shutter, whereby shutter 172 is wide open at the peak of the flash. Assuming the photographer has depressed release 102, and probe portion 154 is in position a in engagement with striker leg 42, the further depression of release 102 brings release base 198 into engagement with surface 196 of latch 188 to rotate latch 188 counterclockwise against the bias of spring 192. Thereafter, lever 182 is released and driven with high force in a clockwise direction under the influence of spring 186 towards position 182'. The upper arm 200 of lever 182 strikes arm 170 (at position 170') of coupling 134, thereby rotating the latter to drive portion 154 upwardly to dislodge striker leg 42 and ignite a flashlamp. Meanwhile, a tab 201 on lower arm 202 strikes impact surface 180 of shutter 172 to open the latter to make an exposure. It can be seen that the relative times at which arm 170 and surface 180 are struck can be controlled by varying the relative disposition of lever arms 200 and 202. It can furthermore be seen that probe 152 has accurately been displaced as a result of the provision of gears 148 and 150. The relative actuating times of the shutter and flash are not affected by the rate at which release 102 is depressed, since the rotation of latch 188 effects both functions. Most of the components of the mechanism are reset to their initial positions by the various restoring springs discussed above. Lever 182 can be reset, for example, by coupling the lever to the film advance, whereby the lever is rotated counterclockwise in response to winding of film in the camera, to its initial latched position. Coupling 134 can return to its initial position under the influence of spring 138 prior to the resetting of lever 182, since the latter, at its released position 182' is not in the return path of arm 170. It should be noted that the upper portion of shutter 172, lever tab 201 and tabs 194 and 196 are designed to permit such reverse movement.

Referring next to FIG. 6, a mechanism similar to that shown in FIG. 4 is depicted, and components substantially identical to those in the preceding embodiment are given their preceding numerical designations. The basic difference between the mechanism shown in FIG. 6 from discussed above is the provision of a second latch actuated by a high energy lever for unlatching an independently driven shutter, as opposed to a shutter driven by the high energy lever itself.

Accordingly, the mechanism in FIG. 6 includes a release 102 provided with the various means and arms mentioned previously, and having springs 110 and 112 attached thereto. Slide 118 is coupled to release 102 by spring 110, and includes the various arms, ears and guide means as explained above, although abutment 168 fulfills a different but analogous function to be described hereinafter. Arm 122 is again provided for blocking slide 118 when no flashcube 14 is inserted in the camera socket. Ear 144 of coupling 134 is engaged with base 146 of slide 118 for transferring the downward motion of slide 118 to probe 152 through engaged sector gears 148 and 150. When a flashcube 14 is mounted on the camera, and there is no pre-energized striker leg 42 at the firing site, the depression of release 102 causes the upper portion 154 of probe 152 to assume position b, and arm 170 of coupling 134 assumes position 170''. On the other hand, if a pre-energized striker leg 42 is located at the firing site, probe portion 154 is blocked at position a, and coupling arm 170 assumes position 170' in the path of high energy lever 182.

The mechanism in FIG. 6 incorporates an alternative to the flag used in the preceding embodiment for indicating that probe portion 154 has assumed position b and no pre-energized striker leg 42 is at the firing site. Accordingly, an electrical circuit is provided comprising connections 204, and electrical source 206 such as a battery, switch elements 208, 210 (the latter being movable for engagement with the former), and an electrical lamp 212 which can be located behind viewfinder 12, or visible therein by means of mirrors, a light pipe, or the like. When probe portion 154 is blocked at position a and slide base 146 assumes position 146', the signal circuit is unaffected. However, when probe portion 154 assumes position b and slide base 146 assumes position 146'', slide tab 168 engages movable switch element 210, and in the process of assuming position 168'' moves element 210 into engagement with stationary switch element 208 to close the circuit and ignite lamp 212, thereby giving the photographer the desired warning.

The means for opening the shutter of the mechanism in FIG. 6 makes it possible to reduce the strength of the drive spring for high energy lever 182, thereby facilitating the ease at which that element can be reset after release. Thus, shutter 214 of the present embodiment can be, for example, the first of a pair of blades of an electronic shutter and defining an aperture 216 for passing light to and through objective 6. Shutter 214 is urged to the right by a strong spring 218 connected to the camera frame. Shutter 214 is set in its tensioned position by a latch 220 having a tab 222 shown in releasable engagement with upwardly extending tab 224 on shutter 214, tabs 222 and 224 being appropriately tapered to facilitate the resetting of shutter 214 after its release. Latch 220 is pivotally mounted on a post 226, and includes an arm 228 in the path of lever 182. A spring 230 biases latch 220 in a clockwise direction against a stop 232.

The mechanism also includes high energy lever 182 as discussed previously, but since the lever only provides the impact energy for actuating probe 152 and does not drive the shutter, the strength of its drive spring 234 is accordingly reduced. Lever 182 is displaceable between its set position and the released position 182' as before, and is latched in the set position by latch 188, which can be pivoted to unlatch lever 182 by release base 198.

Assuming that mechanism is at the stage of its operation wherein probe portion 154 is in position a in engagement with a pre-energized striker leg 42, slide base 146 is at position 146', and arm 170 is at position 170', the further depression of release 102 brings base 198 into engagement with tab 196. Thereafter, latch 188 is pivoted about post 190 against the bias of spring 192, thus unlatching high energy lever 182. As lever 182 rotates about post 184, arm 200 engages arm 170 at position 170' and rotates coupling 134 in a counterclockwise direction about post 136, thus driving probe 152 upwardly to dislodge striker leg 42 and ignite the percussive flashlamp. In timed relation with the latter occurrence, tab 201 on lever arm 202 engages latch arm 228, and rotates latch 220 about post 226 to position 226', thereby releasing shutter 214. Shutter 214 is driven to the right under the influence of spring 218 to effect the desired flash exposure.

Another related embodiment of the invention is shown in FIG. 7, where again components substantially unchanged from the mechanisms just described have retained their previous numerical designations. The essential difference between the mechanism of FIG. 7 and those previously described is that the high energy lever initially released in response to the depression of the body release in turn releases a second high energy lever for providing the energy to dislodge the striker leg of the received percussive flashcube.

Thus, the mechanism of FIG. 7 includes release 102, slide 118, arm 122, coupling 134, probe 152, flag 162 and the various elements associated therewith as discussed in detail before. Leg 116 on release 102 is replaced with an arm 236 having an abutment 238 on the lower end thereof as indicated. The functions of releasing slide 118, and of sensing the presence or absence of a pre-energized striker leg and adjusting the mechanism accordingly are performed as described hereinbefore. Impact shutter 172 in FIG. 4 is also incorporated in the present embodiment.

Shutter 172 is adapted to be struck by a high energy lever 240 driven by a strong spring 242 similar to spring 234 in FIG. 6. Lever 240 is mounted for rotation on post 244, and includes an upper arm 249 for unlatching a second high energy lever 248, and a lower arm 250 for driving shutter 172 to its open position 172'. Lever 240 is held in its set position by a latch 252 which is pivotally mounted on post 254 and biased in a clockwise direction by spring 256. Latch 252 includes a tab 258 at one end for latching the upper arm 249 of lever 240, and an abutment surface 260 on the other side of pose 254 in alignment with abutment 238 on slide arm 236, latch 252 thus being adapted to be rotated to position 252' when slide 102 is fully depressed.

A second latch 262 is mounted on post 264 for rotation thereon, and is urged in a clockwise direction against a stop 266 by a spring 268. Latch 262 includes a downwardly extending arm 270 having a tab 271 lying the rotational path of arm 249 of high energy lever 240, and is adapted to be rotated by that lever. A tab 272 extends downwardly from latch 262 for engaging tab 274 on lever 248 to constrain the latter against the force of a spring spring 276, which urges lever 248 in a clockwise direction about post 278. The upper end 280 of lever 248 is adapted to strike arm 170 of coupling 134 when arm 170 is at position 170'.

After the presence of a pre-energized striker leg 42 has been detected by the mechanism in FIG. 7, the further depression of release 102 causes arm 236 to abut against surface 260 and rotate latch 252 to position 252' to release lever 240. The latter rotates about post 244, arms 249 and 250 striking tab 271 and shutter surface 180 in timed relation as lever 240 proceeds to position 240'. When lever arm 249 strikes tab 271, latch 262 is rotated about post 264 against the influence of spring 268 to release the second high energy lever 248. The latter is driven by spring 276 against arm 170 at position 170' to rotate coupling 134 against the influence of spring 138, to thereby raise probe 152 and dislodge striker leg 42 to ignite a flashlamp. Arm 250, in the meantime, drives shutter 172 to position 172' to effect a flash exposure by uncovering objective 6.

As in the preceding embodiments, most of the various components of the mechanism are reset by their respective restoring springs with the help of the advantageously designed surfaces of the elements at places where they engage one another during the resetting operation. The provision of a plurality of high energy levers reduces the force necessary to reset them. Synchronous flash exposures are assured by the provision of a single member, actuatable by the body release, for initiating both flash ignition and shutter operation. The timing of the latter functions can easily be changed by varying the orientation of arms 249, 250 of the first high energy lever 240.

Another set of related embodiments is disclosed in FIGS. 8-11. Referring to the mechanism shown schematically in FIG. 8, a release 302 comprises a manually accessible cap 301, a pair of vertically aligned slots 304 having pins 306 extending therethrough for restraining release 302 to a prescribed vertical path, an ear 308 having a tab 310 formed thereon, and an ear 312 extending therefrom having a spring 314 attached thereto for urging release 302 to its uppermost position.

A latch 316 is mounted on post 318, and is biased by spring 320 in a clockwise direction about the post. A leg 322 defining a cam surface 324 is provided on latch 316, and cam surface 324 is adapted to be engaged by tab 310 to effect the counterclockwise rotation of the latch. Also extending from latch 316 is an arm 326 having a tab 328 formed thereon for constraining a high energy slide 330 against the influence of strong spring 332. High energy slide 330 includes a tab 334 engageable by tab 328 on latch 316, a pair of axially offset, vertically parallel slots 336 in which are located a pair of pins 338 for restraining the lever to a vertical path, and impact tabs 340 and 342 for effecting flash ignition and shutter actuation respectively.

A percussive flashcube 14, discussed earlier with reference to FIGS. 2 and 3, is shown inserted in camera socket 5. A pre-energized striker leg 42 is set for dislodgement from its engagement with upturned end 50 of the striker wire. An opening 344 is provided in the camera wall to give the end 346 of firing lever 348 access to striker leg 42. Firing lever 348 is pivotally mounted on post 350 and is biased in a clockwise direction by a spring 352 against a stop 354. Spring 332, which provides the energy for dislodging striker leg 42, is much stronger than spring 352. An arm 356 comprises a portion of lever 348 and lies in the path of tab 340 on slide 330. A second latch 358 is pivotally mounted on a post 360 and is urged in a clockwise direction against a stop 362 by a spring 364 which is also weaker than spring 332. Latch 358 includes an abutment 366 at one end in the path of slide tab 342, and a tab 368 at the other end for releasably holding a tab 370 formed on a shutter drive lever 372. The latter element is a high energy lever which is adapted to rotate clockwise about a post 374 under the influence of strong spring 376 to strike and open and impact shutter (not shown).

To operate the preceding mechanism, release 302 is depressed, whereby tab 310 engages cam surface 324 to effect the counterclockwise rotation of latch 316 about post 318 against the force of spring 320. As a result of this rotation, tab 328 becomes disengaged from tab 334 on high energy slide 330, and the latter is driven downwardly under the influence of spring 332. In a predetermined sequence (to effect a synchronous flash exposure), tab 340 strikes arm 356 of lever 348 to rotate the latter element to position 348' and thereby release striker leg 42, and tab 342 strikes abutment 366 to unlatch shutter drive lever 372. The timed relation between the foregoing events can be controlled by varying the distance between tabs 340 and 342 on slide 330. As in the previous mechanisms, the various components are reset by the restoring springs and some external means such as means coupled to the film advance lever of the camera, or else lever 302 can relatch slide 330.

Figure 8:
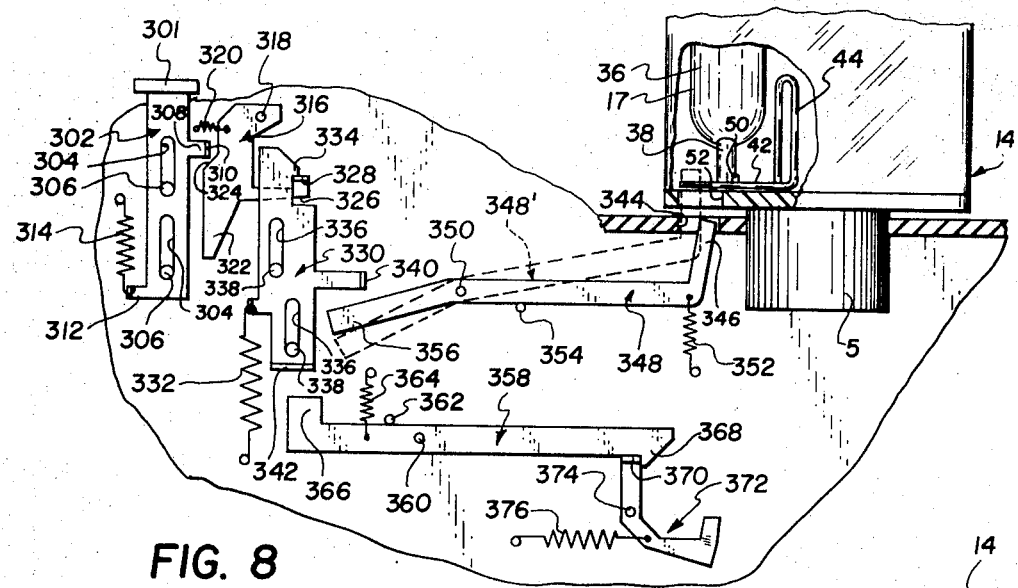
FIGS. 4 and 6–11 are schematic composite views of mechanisms according to the invention.
Figure 9:
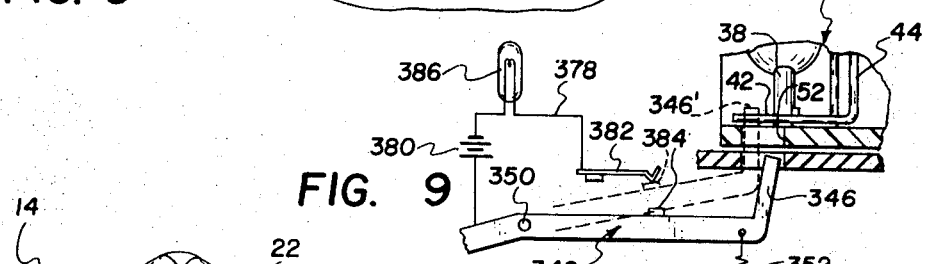

Although not specifically indicated in FIG. 8, means can be provided for indicating whether a striker leg is positioned at the firing site for igniting a flashlamp. Thus, as shown in FIG. 9, an electrical circuit including conductors 378, an electrical source 380, a switch comprising a stationary contact 382 and a movable contact 384 mounted on lever 348, and a lamp 386 visible in the camera viewfinder can be provided. In addition, means (not shown) can be included for pivoting lever 348 counterclockwise about post 350 to a first position in contact with a pre-energized striker leg, or a second position at 346'. In the former situation, the lever rotating means should be of insufficient strength to dislodge striker leg 42. In the latter situation, contacts 384 and 382 are disposed so that the switch is closed in response to the assuming of position 346' by the upper end 346 of lever 348, whereby lamp 386 ignites to give the photographer warning that he cannot make a flash exposure with the flashcube in its present condition.

Figure 10:
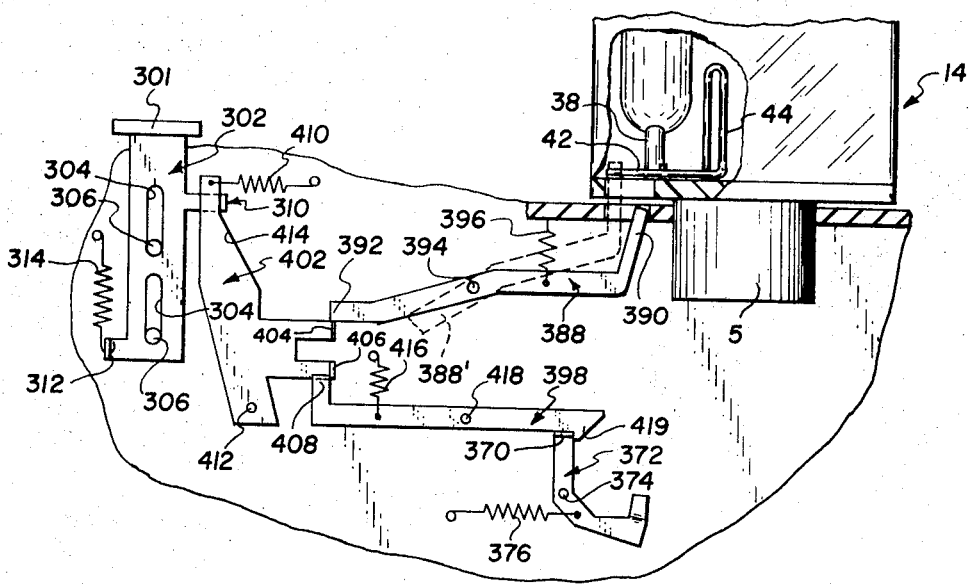

The mechanism in FIG. 10 shows an embodiment where a single latch releases a pair of independent high energy levers in synchronization. The same release as in the immediately preceding embodiment is employed in the mechanism shown in FIG. 10, and like numerical designations are ascribed to the release. The dislodging of pre-energized striker leg 42 is accomplished by means of a high energy lever 388 which includes a striker leg engaging portion 390 at one end of the lever, and a latching tab 392 at the other end. Lever 388 is biased in a counterclockwise direction about a post 394 by a strong spring 396 connected to the camera frame. Shutter driver 372 (described previously with reference to FIG. 8) is releasably held against the force of spring 376 by a second latch 398 which is in turn held against the influence of spring 416 by a first latch 402.

Latch 402 includes upper and lower tabs 404 and 406; the lower edge of tab 392 is urged against the top of tab 404, and the right side edge of tab 408 is urged against the left face of tab 406. A spring 410 biases latch 402 in a clockwise direction about a post 412, and a cam surface 414 is in sliding engagement with tab 310 on release 302. Latch 398 is spring biased by element 416 in a clockwise direction about post 418, and includes an ear 419 for releasably restraining shutter drive lever 372 against the force of spring 376.

Upon depression of release 302, latch 402 is urged in a counterclockwise direction as tab 310 slides down cam surface 414, thereby releasing lever 388 and rotating latch 398 counterclockwise against the force of spring 416. Spring 396 urges lever 388 counterclockwise to position 388' so that portion 390 engages and dislodges striker leg 42 to effect flash ignition. When tab 406 on latch 402 moves ear 419 on latch 398 out of engagement with lever 372, the latter rotates clockwise and opens the camera shutter (not shown). The mechanism is reset by means (not shown) coupled to the film transport mechanism. Synchronization can be controlled by controlling the locations of tabs 404 and 406 on latch 402, or by controlling the relative dispositions of tabs 392 and 408 and members 388 and 398 respectively.

Figure 11:
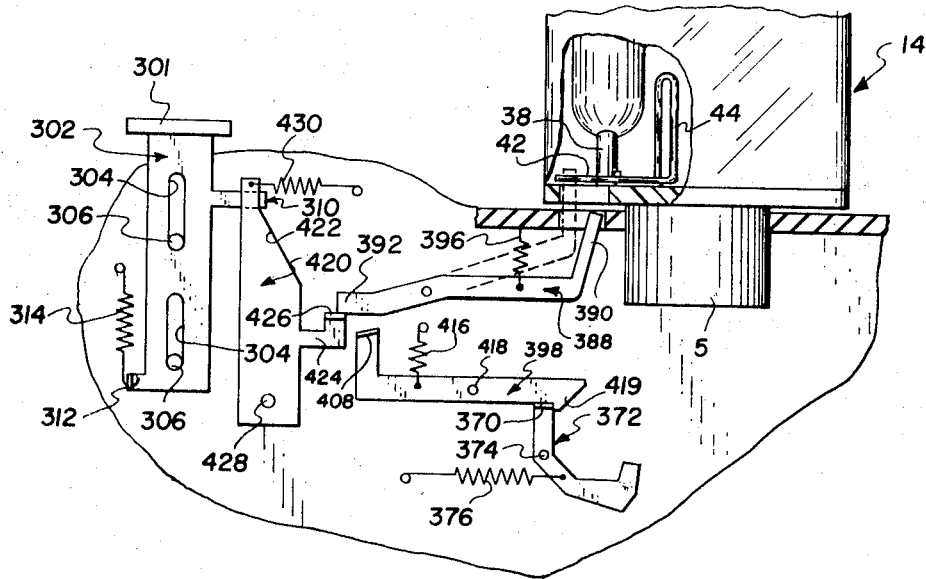

A further embodiment of the invention is illustrated in FIG. 11, wherein release 302, levers 388 and 372, and latch 398 and their associated springs are again incorporated in the mechanism. A latch 420, similar to latch 402 described above, is coupled with release 302 by means of the sliding engagement of tab 310 with cam surface 422 defined by the latch. An arm 424 extends from latch 420 and has formed thereon a tab 426 upon which rests lever end 392. Latch 420 is biased in a counterclockwise direction about post 428 by spring 430, thereby assuring the engagement of cam surface 422 with tab 310. It should be noted that latch 420 only restrains lever 388 against movement (and not lever 398). Lever 398 is slightly modified from the depiction thereof in the preceding figure, in that tab 408 is disposed at a slight angle and positioned in the downward path of the end 392 of lever 388.

To operate the mechanism shown in FIG. 11, release 302 is depressed, and tab 310 rides down cam surface 422 to rotate latch 422 counterclockwise about post 428. When tab 426 clears tab 392 of lever 388, the latter is driven counterclockwise by strong spring 396. The rotation of lever 388 causes end portion 390 to dislodge striker leg 42 to ignite a flashlamp, and tab 392 to strike tab 408 and rotate latch 398 about post 418 to unlatch shutter 372 and thereby effect a synchronized flash exposure.

It should be apparent from the preceding description that an invention has been provided for effecting synchronized flash exposures by means of the mere depression of the body release of a camera. Moreover, synchronization is not affected by the rate at which the release is actuated. Means have been provided for warning the photographer when a flash exposure cannot be effected because there is no pre-energized striker leg at the firing site. Other advantages have been mentioned previously or should be apparent to those skilled in the art.

The invention has been described in detail with particular reference to the preferred embodiments thereof, but it will be understood that variations and modifications can be effected within the spirit and scope of the invention.

What is claimed is:

1. For use in a camera for receiving a percussive flash device having a percussion ignitable flashlamp and a pre-energized impacting member releasable from a set position for igniting the flashlamp, a mechanism actuatable for effecting the release of the pre-energized impacting member in a received flash device, said mechanism comprising:

means movable to a first position for initiating actuation of said mechanism;

means movable to a second position for releasing the pre-energized impacting member of a received flash device, said releasing means having gear teeth engageable for moving said releasing means; and means coupling said actuation initiating means and said releasing means, said coupling means comprising a gear engageable with the gear teeth of said releasing means and movable in response to movement of said actuation initiating means to said first position for moving said releasing means to said second position.

2. For use in a camera for receiving a percussive flash device having a percussion ignitable flashlamp and an impacting member, the impacting member being releasable from a pre-energized condition to a released condition for igniting the flashlamp, means actuatable for indicating when the impacting member of a received flash device is in a released condition, said indicating means comprising:

means movable towards a first position for initiating actuation of said indicating means;

sensing means movable to a predetermined position when the impacting member is in the released condition, said sensing means having gear teeth engageable for moving said sensing means;

means for coupling said actuation initiating means and said sensing means and including a gear in driving engagement with the gear teeth of said sensing means, said coupling means being movable in response to movement of said actuation initiating means towards said first position; and means responsive to the movement of said sensing means to said predetermined position for signaling when the impacting member is in the released condition.

* * * * *